United States Patent [19]

Knowles

[11] Patent Number: 4,470,606
[45] Date of Patent: Sep. 11, 1984

[54] UNIVERSAL FLUID-SEALING JOINT FOR OUTLET PIPE FROM FLUID-CONTAINING HOUSING

[75] Inventor: Albert H. Knowles, Concord, N.H.
[73] Assignee: K.R. Associates, Inc., Concord, N.H.
[21] Appl. No.: 562,041
[22] Filed: Dec. 16, 1983

Related U.S. Application Data

[63] Continuation of Ser. No. 272,339, Jun. 6, 1981, abandoned.

[51] Int. Cl.³ .......................... F16J 15/10; F16J 15/48
[52] U.S. Cl. .......................................... 277/4; 277/27; 277/212 F; 277/1; 4/507; 285/9 R; 285/95; 285/235; 285/405
[58] Field of Search .................. 277/3, 4, 27, 138, 165, 277/212 R, 180, 212 F, 212 FB, 181, 1; 285/9 R, 46, 57, 95, 104, 128, 162, 194, 235, 236, 405, 414, DIG. 16; 4/191, 195, 507, DIG. 7; 52/221; 248/56; 403/50, 51; 138/97, 98; 174/93; 74/18, 18.1, 18.2; 354/64

[56] References Cited

U.S. PATENT DOCUMENTS

| | | | |
|---|---|---|---|
| 1,148,090 | 7/1915 | James | 285/95 X |
| 1,566,633 | 12/1925 | Taylor | 277/212 F X |
| 2,029,393 | 2/1936 | Sargent | 285/46 |
| 2,143,469 | 1/1939 | Banks | 285/9 R X |
| 2,180,960 | 11/1939 | Kennedy | 285/DIG. 16 X |
| 2,244,939 | 6/1941 | Carlson | 285/46 X |
| 2,494,598 | 1/1950 | Waring | 285/95 X |
| 2,678,646 | 5/1954 | Bruner et al. | 277/181 |
| 2,693,975 | 11/1954 | Smith | 277/212 X |
| 2,706,124 | 4/1955 | Koch | 277/4 X |
| 3,059,330 | 10/1962 | Blair | 285/95 X |
| 3,325,172 | 6/1967 | Herbold | 277/26 |
| 3,354,508 | 11/1967 | Draben | 285/9 R X |
| 3,490,791 | 1/1970 | Mitchell | 285/162 X |
| 3,720,964 | 3/1973 | Thomson | 52/221 X |
| 3,731,954 | 5/1973 | Haglund | 285/DIG. 16 X |
| 3,788,655 | 1/1974 | Hathaway | 277/212 F |
| 3,845,961 | 11/1974 | Byrd | 248/56 X |
| 3,958,313 | 5/1976 | Rossborough | 285/162 X |
| 4,092,746 | 6/1978 | Harris | 4/507 X |
| 4,365,829 | 12/1982 | Fowler | 285/236 X |

FOREIGN PATENT DOCUMENTS

| | | | |
|---|---|---|---|
| 38114 | 7/1909 | Austria | 277/212 F |
| 2100369A | 12/1982 | United Kingdom | 277/180 |
| 505851 | 5/1976 | U.S.S.R. | 285/95 |

Primary Examiner—Robert S. Ward
Attorney, Agent, or Firm—Rines and Rines; Shapiro and Shapiro

[57] ABSTRACT

A novel seal around conduits passed through walls of fluid-containing housings embodying a stretchable annular butyl-rubber-like sheet washer stretch-fitted upon the inner end of the conduit and conformed to the inner wall portion of the housing around the conduit and held there-against by the pressure of the fluid against the washer irrespective of the contour or irregularities or material of the inner wall surface.

1 Claim, 3 Drawing Figures

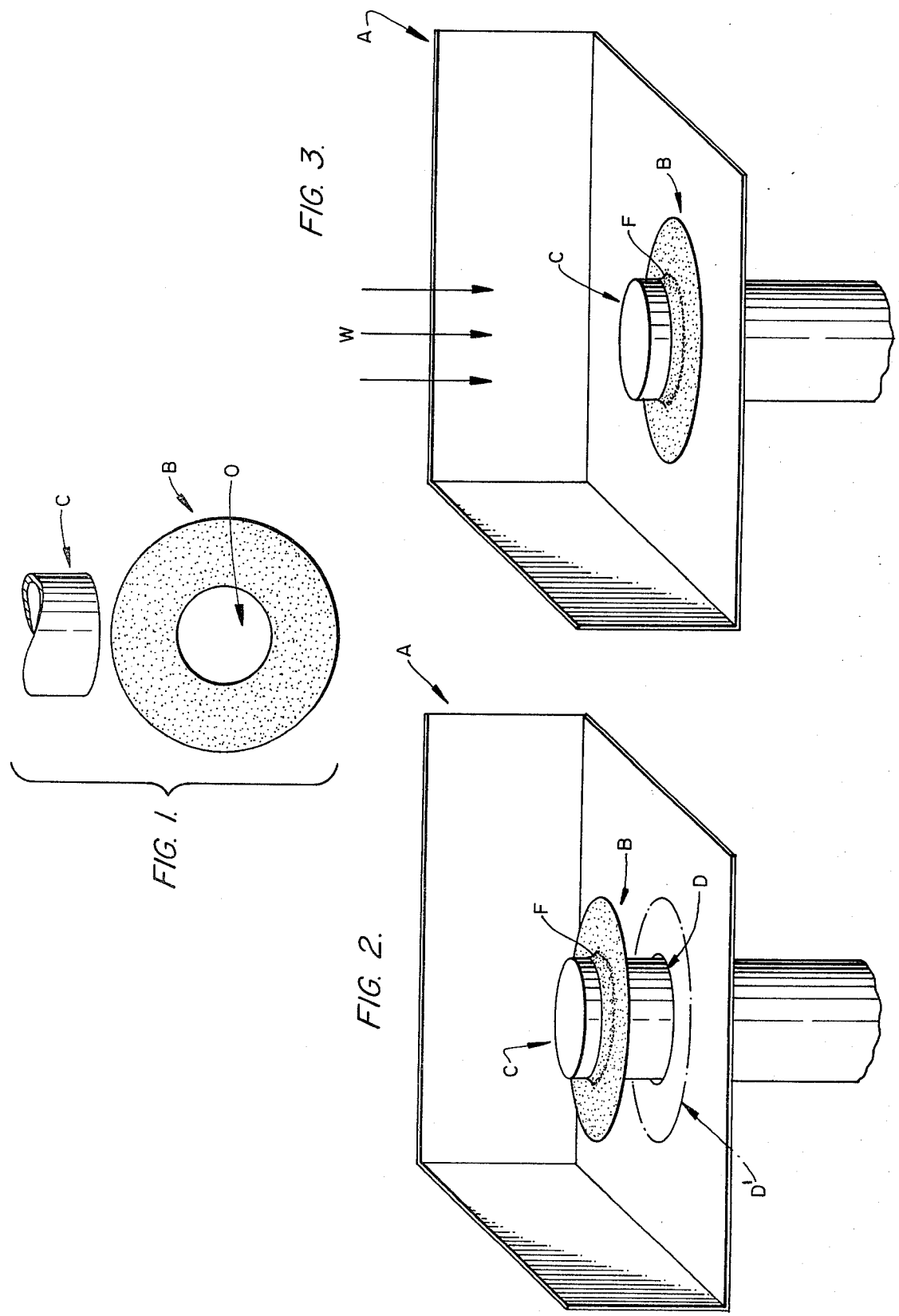

UNIVERSAL FLUID-SEALING JOINT FOR OUTLET PIPE FROM FLUID-CONTAINING HOUSING

This is a continuation of application Ser. No. 272,339, filed June 6, 1981 and now abandoned.

The present invention relates to fluid-conduit joints, being more particularly concerned with, seal-connecting outlet pipes and the like to fluid-containing housings of varying surface shapes or contours, such as water pools or containers, and industrial and other fluidholding tanks and the like.

In accordance with prior and present-day techniques, the problem of connecting an outlet conduit or pipe to a fluid-containing tank, for example, is approached by using special joint assemblies with external collars of different sizes having flanges for bolting from outside the housing to a flat wall portion thereof. In the case of plastic or fiber housings, the outlet pipe is inserted into the external collar and glued or adhesively bonded therewithin. For metal tanks, the collar is provided with grooves into which the pipe may be threaded and/or locked with ring gaskets and the like. Each different-sized conduit requires a different collar; and, with circular tanks or housings, specially designed joints with expensive fittings for sealing are required with welding or similar techniques being needed for metal housings. When the housing wall surface is irregular, moreover, as with corrugations or bends, or when it is desired to put an outlet in a corner of the tank, the art has not, to applicant's knowledge, heretofore generally developed satisfactory facile, inexpensive sealed joint techniques, and certainly not such that are universally applicable to all contours, materials, and a wide variety of size and shape variations.

It is to this problem, accordingly, that the present invention is principally directed, it being an object of the invention to provide a new and improved fluidconduit sealing joint that obviates all of the above problems and, indeed, provides an inexpensive and highly effective almost universal sealed joint usable irrespective of the contour or irregularities of the fluid-containing housing wall surfaces.

A further object is to provide a novel fluid joint seal assembly of more general utility, as well.

Other and further objects will be explained hereinafter and are more particularly pointed out in the appended claims.

In summary, from one of its important aspects, the invention embraces a joint for sealing a fluid-carrying conduit through a hole in a wall of a fluid-containing housing through which the conduit may extend, and irrespective of the contour or irregularities of the wall surface, the joint having, in combination, a thin stretchsurface, able resilient rubber-like apertured washer sheet of outer cross-dimension greater than that of the hole and inner opening cross-dimension sufficiently less than that of the conduit such that, when stretch-forced over the inner end of the conduit within the housing, the sheet material of the washer deforms into a sealed flange or neck extending from the outer surface of the washer along the conduit towards its inner end; the inner surface of the washer being intimately conformable with the corresponding portions of the said wall surface around the conduit irrespective of its contour or irregularities in response to fluid pressure within the housing against the said outer surface of the washer to maintain an impermeable interior seal about the conduit and against the housing wall.

The invention will now be described with reference to the accompanying drawing, FIG. 1 of which is a view of unassembled component parts of the preferred structure of the invention;

FIG. 2 is a fragmentary isometric view of application of the structure of FIG. 1 to the inside of a housing for containing fluid; and FIG. 3 is a similar view of the installed structure of FIG. 2 in use, with fluid bearing there-against.

Referring to the drawings, component parts utilized in the novel joint assembly of the invention include the conduit or pipe C that, for example, is to be applied as an outlet flow pipe for a tank or housing A containing water (as in a fish tank or in a pool, as an illustration), and a thin, stretchable, resilient annular washer, of rubber-like sheet material, such as butyl rubber and the like. A hole D is illustrated as formed in the lower wall of the corner of the housing A depicted in FIG. 2, of diameter a little larger than that of the conduit C and through which it is passed to the outside (below). The cross-section or diameter of the apertured washer opening 0 is made smaller than that of the conduit C, as more particularly shown in FIG. 1, so that it can be tightly stretch-forced or fitted over the inner end, out of the plane of the upper or outer surface of the washer B.

The outer diameter of the washer B is made large enough to cover the inner bottom wall surface portions of the housing A immediately about the conduit so as to overlie and mold itself to the same in intimate conformance (FIG. 3), when subjected to the pressure of the water or other fluid W that fills the housing A.

The thickness of the thin washer B is adjusted to permit close mold-like conformance with these bottom wall surface portions around or about the conduit under the action of the fluid pressure within the housing A. If close tolerance is not maintained in forming the hole D, but there are significant gaps between the conduit C and the hole D, or even different geometries of hole and conduit, the thickness and outer diameter of the washer B will be made sufficient adequately to cover such gaps and to effect sealing without bulging into the gap under the water pressure.

Thus, irrespective of the contour or irregularities in the wall surface of the housing (including corrugations, curves, corners, etc), a universal sealing is effected with this inexpensive and yet highly efficacious seal joint—and irrespective of the material of the housing (metal, plastic, fiber, etc.). The invention, being installed inside the housing, has obviated all external collars, bolts, welds, etc., has provided adaptation to all wall materials, configurations and contours, and enables use with poor tolerances of holes and different shapes and sizes of joint components, quite universally.

To avoid dis-assembly or shift when the housing is drained, and further to aid in sealing, an adhesive layer D' may be interposed under the lower or inner sufface of the washer as illustrated in FIG. 2.

For a 6-inch water outlet conduit, as an illustration, for use with round corrugated sheet-metal-walled ponds of several foot water depth, a butyl rubber washer B of about 20 guage thickness (about 1/32 inch) has been successfully tested over several years, with integrity of seal joint, and with a washer opening diameter of about 3 inches (of the order of about half the diameter of the conduit) and about a one-foot outer diameter, and employing rubber bonding glue at D'.

Modifications will occur to those skilled in this art, and such are considered to fall within the spirit and scope of the invention as defined in the appended claims.

What is claimed is:

1. A method of providing a seal between a liquid-carrying pipe of round cross-section and a bottom wall of a liquid-containing tank having a hole therein through which the pipe extends, and irrespective of the contour or irregularities of the inner surface of the bottom wall around the hole, comprising providing a thin, flat, stretchable, resilient butyl-rubber-like washer sheet that is of the order of 1/32 inch thick, that has outer cross-dimensions substantially greater than the cross-dimensions of said hole, and that has a round central opening therethrough with a diameter of the order of ½ the diameter of said round pipe cross-section, inserting the pipe into the hole in the bottom wall of the tank so that a free end of the pipe is in the tank and provides an exposed extremity of said round pipe cross-section, forcing said extremity through said opening in said washer sheet and thereby stretching said washer sheet to deform it into a central sleeve portion and a flange portion, with said sleeve portion extending along the pipe toward said extremity, being sealed to said pipe by virtue of said stretching, and having its outer surface totally exposed to liquid in said tank, and with said flange portion of said washer sheet extending outwardly from said pipe, positioning said washer sheet so that said flange portion contacts said inner surface of the bottom wall around said hole, and providing sufficient liquid in said tank to cause the pressure of said liquid acting against said flange portion to conform said flange portion intimately with said inner surface of said bottom wall around said hole, irrespective of the contour or irregularities of that surface, so as to maintain an impermeable seal internally of said tank around said pipe and against the bottom wall of said tank.

* * * * *